United States Patent
Kim

(10) Patent No.: US 10,295,072 B2
(45) Date of Patent: May 21, 2019

(54) VALVE ASSEMBLY FOR CONTROLLING DIRECTION OF FLUID FLOW ACCORDING TO DIRECTION OF INCLINATION

(71) Applicant: HYUNDAEKANGJEON CO., LTD., Changwon-si, Gyeongsangnam-do (KR)

(72) Inventor: Yong-Soo Kim, Changwon-si (KR)

(73) Assignee: HYUNDAEKANGJEON CO., LTD. (KR)

( * ) Notice: Subject to any disclaimer, the term of this patent is extended or adjusted under 35 U.S.C. 154(b) by 0 days.

(21) Appl. No.: 15/791,549

(22) Filed: Oct. 24, 2017

(65) Prior Publication Data
US 2019/0078694 A1    Mar. 14, 2019

Related U.S. Application Data

(63) Continuation of application No. PCT/KR2017/010114, filed on Sep. 15, 2017.

(30) Foreign Application Priority Data

Sep. 13, 2017  (KR) ........................ 10-2017-0117403

(51) Int. Cl.
*F16K 15/04*    (2006.01)
*F16K 31/22*    (2006.01)

(52) U.S. Cl.
CPC ............ *F16K 15/042* (2013.01); *F16K 31/22* (2013.01); *Y10T 137/0874* (2015.04)

(58) Field of Classification Search
CPC ........ F16K 15/042; F16K 15/04; F16K 21/22; F16K 31/22; Y10T 137/0874; Y10T 137/0898; Y10T 137/0753
See application file for complete search history.

(56) References Cited

U.S. PATENT DOCUMENTS

| | | | | |
|---|---|---|---|---|
| 2,332,007 A | * | 10/1943 | Parker | B64D 37/22 137/38 |
| 2010/0170152 A1 | * | 7/2010 | Perkins | A01G 23/14 47/52 |

FOREIGN PATENT DOCUMENTS

| JP | 2002-310315 A | 10/2002 |
|----|---------------|---------|
| JP | 2013-204698 A | 10/2013 |

(Continued)

OTHER PUBLICATIONS

Korean Office Action (KR 10-2017-0117403), KIPO, dated Dec. 18, 2017.

(Continued)

*Primary Examiner* — Kevin L Lee
(74) *Attorney, Agent, or Firm* — Park & Associates IP Law, P.C.

(57) ABSTRACT

The present invention proposes a valve assembly for controlling a fluid to flow only in a certain direction according to inclination directions. A valve body 10 of the valve assembly includes a partition 14 formed with a through hole 14*a* and dividing an inside into a first internal channel 18*a* and a second internal channel 18*b*, a first entrance 12*a* for supplying a fluid from the first internal channel to an outside or a fluid from the outside to the first internal channel, and a second entrance 12*b* for supplying a fluid from the second internal channel to an outside or a fluid from the outside to the second internal channel. Further, a first check roller 11*a* and a second check roller 11*b* are in close contact with or separated from the through hole by buoyancy or sedimentation according to inclination directions of the valve body, thereby controlling the fluid to flow in a certain direction. Further, the first check roller and the second check roller are prevented from being in contact with the first entrance and the second entrance by the flow of the fluid in the first (Continued)

internal channel and the second internal channel, and the flow of the fluid is accurately controlled by only the inclination directions.

10 Claims, 13 Drawing Sheets

(56) References Cited

FOREIGN PATENT DOCUMENTS

| | | |
|---|---|---|
| JP | 5700449 B2 | 4/2015 |
| KR | 10-2005-0050481 A | 5/2005 |
| KR | 10-1586788 B1 | 1/2016 |
| KR | 10-1709667 B1 | 2/2017 |

OTHER PUBLICATIONS

International Search Report (PCT/KR2017/010114), WIPO, dated Jun. 7, 2018.

* cited by examiner

VALVE ASSEMBLY FOR CONTROLLING DIRECTION OF FLUID FLOW ACCORDING TO DIRECTION OF INCLINATION

REFERENCE TO RELATED APPLICATIONS

This is a continuation of pending International Patent Application PCT/KR2017/010114 filed on Sep. 15, 2017, which designates the United States and claims priority of Korean Patent Application No. 10-2017-0117403 filed on Sep. 13, 2017, the entire contents of which are incorporated herein by reference.

FIELD OF THE INVENTION

The present invention relates to a valve assembly for controlling a direction of fluid flow according to inclination directions, and more particularly to a valve assembly configured to make fluid flow only in a certain direction according to inclination directions of a valve.

BACKGROUND OF THE INVENTION

In general, a valve is placed in a channel of a fluid and used for controlling the flow of the fluid. As an example of the most basic control for opening or closing such a valve, there is an operator's manual control. Besides, various kinds of control based on an electric signal have been known.

The valve opened or closed by force based on the foregoing operator or electricity has been developed to have various forms and structures. Furthermore, Korean patent No. 10-1709667 has proposed a valve assembly that is opened or closed by not the external force but its own inclination. However, there are disadvantages to such a valve assembly that may have complicated structures as compared with functions and may have a problem with exact operation due to internal pressure of a valve body.

SUMMARY OF THE INVENTION

To overcome the disadvantages, an aspect of the present invention is to provide a valve assembly for controlling fluid to flow only in a certain direction according to inclination directions of a valve.

Another aspect of the present invention is to provide a valve assembly for controlling a flowing direction of fluid accurately depending on only an inclination direction regardless of the flow, pressure, etc. of the fluid inside a valve body.

In accordance with an embodiment of the present invention, there is provided a valve assembly including; a valve body configured to include a partition formed with a through hole and dividing an inside into a first internal channel and a second internal channel, a first entrance for supplying a fluid from the first internal channel to an outside or a fluid from the outside to the first internal channel, and a second entrance for supplying a fluid from the second internal channel to an outside or a fluid from the outside to the second internal channel; a first check roller and a second check roller configured to be in close contact with or separated from the through hole by buoyancy or sedimentation according to inclination directions of the valve body; and a restrictor configured to prevent the first check roller and the second check roller from being in close contact with the first entrance and the second entrance by flow of a fluid in the first internal channel and the second internal channel.

According to another embodiment of the present invention, the valve assembly may further include an interlocker configured to interlock the second check roller with the first check roller to move in one direction so that movement of the first check approaching the through hole can cause the second check roller to move apart from the through hole.

According to an embodiment of the interlocker, it may be materialized by an interlocking pin shaped like a bar or a plate supported on the partition and movable within a predetermined range.

According to another embodiment of the interlocker, it may be materialized by an interlocking pin for interlocking the first check roller with the second check roller to move in one direction so that only one of the first check roller and the second check roller can be in close contact with the through hole.

In more detail, the first check roller and the second check roller may have buoyancy in the fluid. Further, the restrictor may include a pair of plate-shaped stoppers extended and formed from a ceiling of the valve body downward between the first check roller and the first entrance and between the second check roller and the second entrance, respectively.

According to an alternative embodiment, the first check roller and the second check roller may have sedimentation in the fluid. Further, the restrictor may include a pair of plate-shaped stoppers extended and formed from a bottom of the valve body upward between the first check roller and the first entrance and between the second check roller and the second entrance, respectively.

The restrictor according to the present invention may prevent the first check roller and the second check roller from being in close contact with the through hole by flow of the fluid in the first internal channel and the second internal channel.

With the foregoing valve assembly according to the present invention, the following effects are expected.

The valve assembly according to the present invention is configured to control the fluid to flow only in one between a first direction and a second direction according to the valve body's own inclination directions without any separate external power. Therefore, if the valve assembly is installed in a movable body by way of example, it is convenient to control the flowing direction of the fluid according to the orientations of the movable body.

Further, the check roller of the valve assembly according to the present invention is designed to be free from the flow of the fluid occurring in the internal channel of the valve body, force caused by the flow of the fluid, etc. For example, the interlocker and the restrictor are provided to make the check roller or the check ball substantially not react with the flow of the fluid inside the valve body. With this configuration, the valve assembly according to the present invention makes the flowing direction of the fluid be varied depending on only the valve body's own inclination directions, thereby having an effect on improving reliability of operations.

DETAILED DESCRIPTION OF THE INVENTION

Below, embodiments of the present invention will be described in more detail with reference to accompanying drawings.

Figure 1:
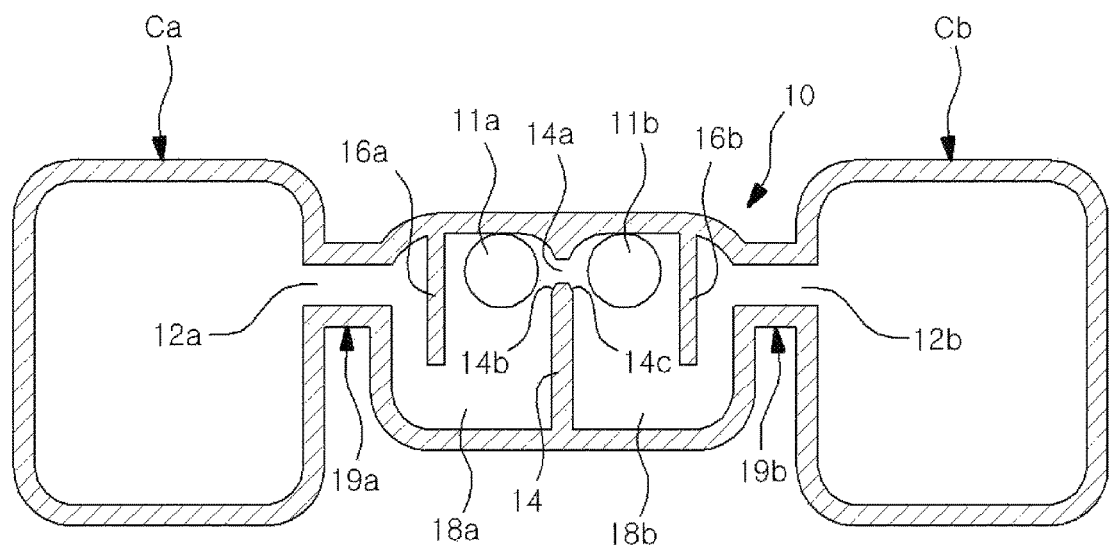
FIG. 1 is a cross-sectional view of a valve assembly according to a first embodiment of the present invention.

Referring to FIG. 1, the structure of a valve assembly according to the present invention is as follows. As shown therein, the valve assembly according to the present invention includes a valve body 10 internally formed with an internal channel 18 through which fluid passes, and a first fluid casing Ca and a second fluid casing Cb respectively connected to the opposite sides of the valve body 10.

The valve body 10 in this embodiment includes a first entrance 12a communicating with the first fluid casing Ca, and a second entrance 12b communicating with the second fluid casing Cb. The first entrance 12a and the second entrance 12b are disposed opposite to each other, so that fluid can flow from the internal channel 18 to the first fluid casing Ca or the second fluid casing Cb or from the first fluid casing Ca or the second fluid casing Cb to the internal channel 18 through the first entrance 12a and the second entrance 12b.

The valve body 10 is internally formed with the internal channel in which fluid flows. As shown in FIG. 1, the internal channel is partitioned by a partition 14 into a first internal channel 18a formed at a left side and a second internal channel 18b formed at a right side. Further, the first internal channel 18a and the second internal channel 18b communicate with each other through a through hole 14a. Below, all of the first internal channel 18a and the second internal channel 18b will be called the internal channel 18. Further, settling portions 14b and 14c, with which check rollers 11a and 11b come in contact, are respectively formed at the left side and the right side of the through hole 14a of the partition 14 formed in a middle portion of the valve body 10.

Further, the valve body 10 is internally provided with a pair of check balls or check rollers 11a and 11b. This embodiment shows that the check rollers 11a and 11b are formed lengthwise in a certain direction (i.e. a direction of traversing the valve body) on the contrary to the check balls, and the through hole 14a is also formed lengthwise in the certain direction corresponding to the check roller and clogged with the check roller 11a or 11b.

Alternatively, the valve assembly may employ the check balls instead of the check rollers 11a and 11b. In this case, the through hole 14a is formed corresponding to the check ball and small enough to be clogged with the check ball. According to an embodiment of the present invention, the check rollers 11a and 11b will be described below as a representative of the check ball and the check roller, and the check rollers 11a and 11b are substantially equivalent to the check balls.

Between the first entrance 12a and the first check roller 11a of the valve body 10 is formed a first stopper 16a for preventing the first entrance 12a from being clogged with the check roller 11a, and between the second entrance 12b and the second check roller 11b is formed a second stopper 16b for preventing the second entrance 12b from being clogged with the check roller 11b.

The stoppers 16a and 16b are to prevent the check rollers 11a and 11b from clogging the entrances 12a and 12b or the through hole 14a as fluid flows in the valve body 10. That is, the check rollers 11a and 11b in the valve body 10 have to move reacting to buoyancy or sedimentation according to only inclination directions, thereby guaranteeing accurate operations of the valve assembly according to the present invention.

Thus, the stoppers 16a and 16b according to the present invention may have various shapes for restricting the flow of the fluid so that the check rollers 11a and 11b can be prevented from clogging the entrances 12a and 12b by the fluid flowing out of the through hole 14a or from clogging the through hole 14a by the fluid flowing out of the entrances 12a and 12b.

In this illustrated embodiment, the stoppers 16a and 16b may be shaped like walls extended from a ceiling of the valve body 10 downward, but not limited thereto. For example, the stoppers may be shaped like a mesh placed in front of each of the entrances 12a and 12b so that the check rollers 11a and 11b cannot be in close contact with the entrances 12a and 12b. Besides, the stoppers may be shaped like various projections so that the check rollers 11a and 11b cannot be in close contact with the entrances 12a and 12b.

In this embodiment, the valve body 10 is connected to the fluid casings Ca and Cb through connectors 19a and 19b. In the embodiment shown in FIG. 1, the foregoing check rollers 11a and 11b have a lower specific gravity than the filled fluid and are thus buoyant, thereby clogging or opening the through hole 14a based on the buoyancy.

With the foregoing structures, operations of the first embodiment of the present invention will be described below.

Figure 2:
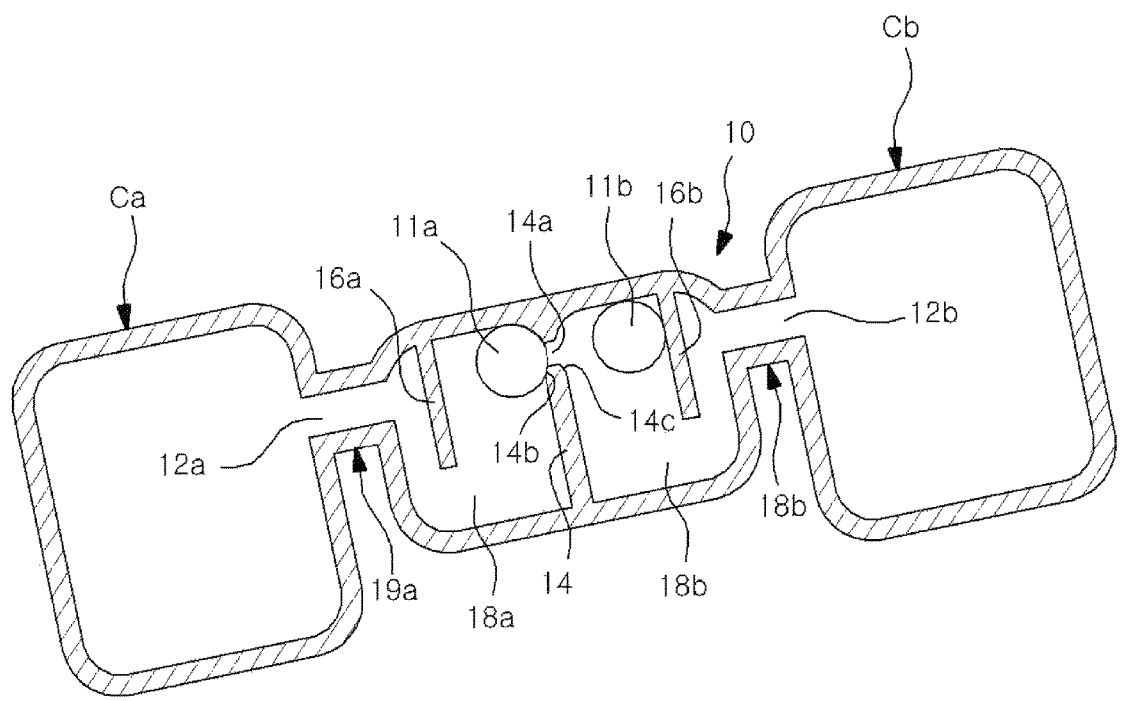
FIG. 2 is a cross-sectional view of the valve assembly inclined to one side according to the first embodiment of the present invention.
Figure 3:
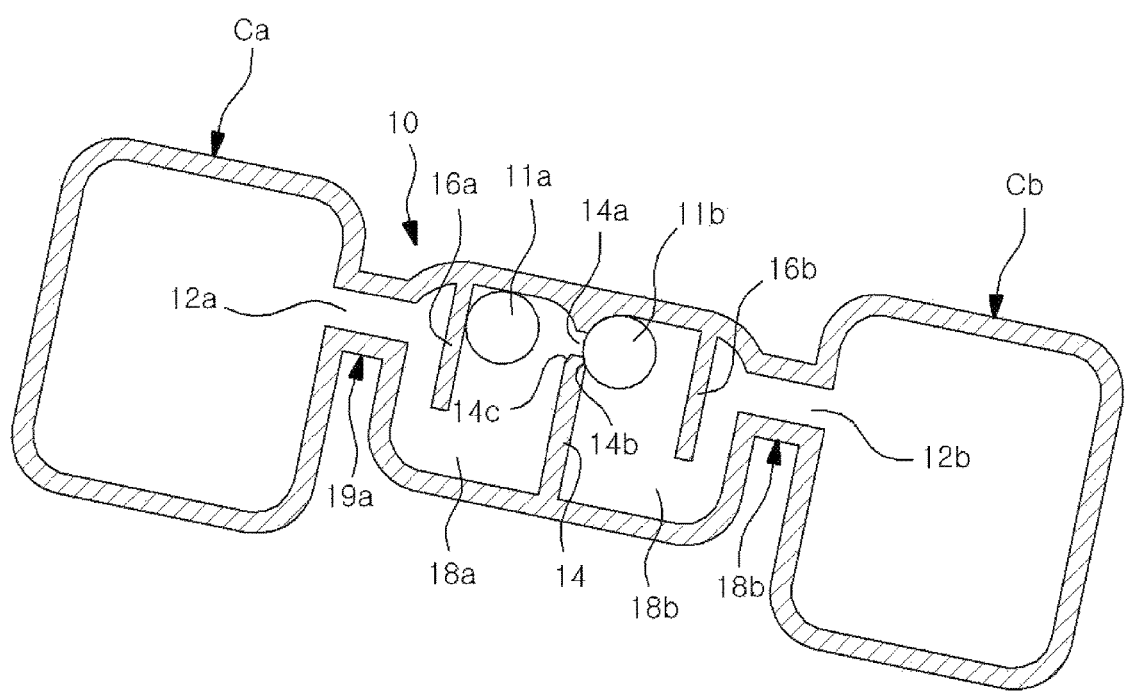
FIG. 3 is a cross-sectional view of the valve assembly inclined to the other side according to the first embodiment of the present invention.

FIG. 2 illustrates that the valve assembly according to the present invention is inclined toward a first direction (i.e. in a direction where the left side is low), and FIG. 3 illustrates that the valve assembly is inclined toward a second direction (i.e. in a direction where the right side is low). Referring to FIG. 2, the check rollers 11a and 11b are buoyant so that the first check roller 11a can be in close contact with the through hole 14a and the second check roller 11b can be separated from the through hole 14a. That is, the first check roller 11a is in close contact with a first settling portion 14b of the through hole 14a, and the second check roller 11b is separated from a second settling portion 14c of the through hole 14a.

Therefore, the fluid is not allowed to flow from the internal channel 18a at the left side toward the internal channel 18b at the right side. Even in this state, it is quite possible to make the fluid flow from the internal channel 18b at the right side toward the internal channel 18a at the left side. Therefore, as shown in FIG. 2, if the left side is low, the flow of the fluid from the first fluid casing Ca toward the second fluid casing Cb via the internal channel 18 is impossible, but the flow of the fluid from the second fluid casing Cb toward the first fluid casing Ca via the internal channel 18 is possible.

FIG. 3 illustrates that the right side is lower than the left side, in which the fluid is allowed to flow from the internal channel 18a at the left side toward the internal channel 18b at the right side for the same reason as described above. In this state, the fluid is allowed to flow only in a direction from the first fluid casing Ca to the second fluid casing Cb via the internal channel 18.

According to the foregoing embodiment of the present invention, it will be understood that the fluid flows from the relatively high-positioned fluid casing Cb toward the relatively low-positioned fluid casing Ca. Here, basic force for moving the fluid is caused by external force. For example, the external force applied to one of the fluid casings may cause the fluid in that fluid casing to move to another fluid casing via the internal channel 18.

In this embodiment, the stoppers 16a and 16b are to prevent the check rollers 11a and 11b from being in close contact with and clogging their respectively corresponding entrances 12a and 12b or the through hole 14a of the partition 14 even though the fluid flows inside the valve body. The stoppers 16a and 16b may be properly varied in shape and position depending on the buoyancy, sedimentation or the like of the check rollers 11a and 11b.

Figure 4:
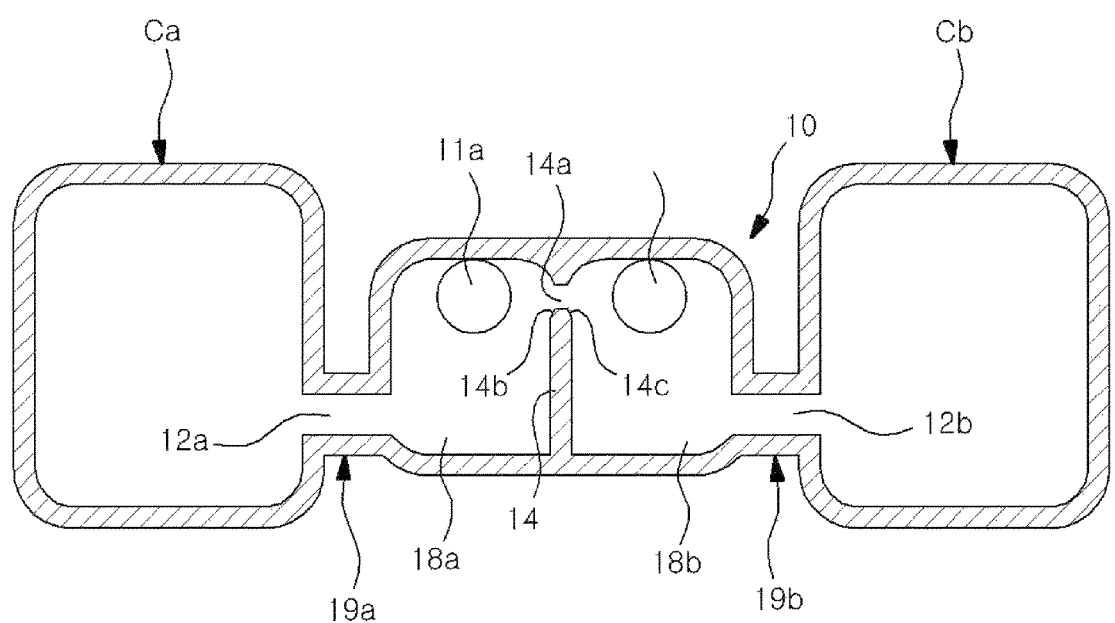
FIG. 4 is a cross-sectional view of a valve assembly according to a second embodiment of the present invention.

FIG. 4 illustrates a structure without the stoppers 16a and 16b of the foregoing embodiment. As shown therein, the close contact with the check rollers 11a and 11b having buoyancy occurs around the ceiling of the internal channel 18, but the entrances 12a and 12b for communicating with the fluid casings Ca and Cb of the valve body 10 are formed close to the bottom of the valve body 10. Accordingly, this embodiment shown in FIG. 4 makes it possible to remove the stoppers 16a and 16b from the structure according to the embodiment shown in FIG. 1. Further, operations of the valve assembly in this embodiment are substantially equivalent to those described with reference to FIG. 2 and FIG. 3, and thus repetitive descriptions will be avoided.

In the embodiments described above, the check rollers 11a and 11b or the like check balls are made of a material having buoyancy. Alternatively, the check roller may be made of a material denser than the fluid flowing within the valve body so as to have not the buoyancy but sedimentation.

Figure 5:
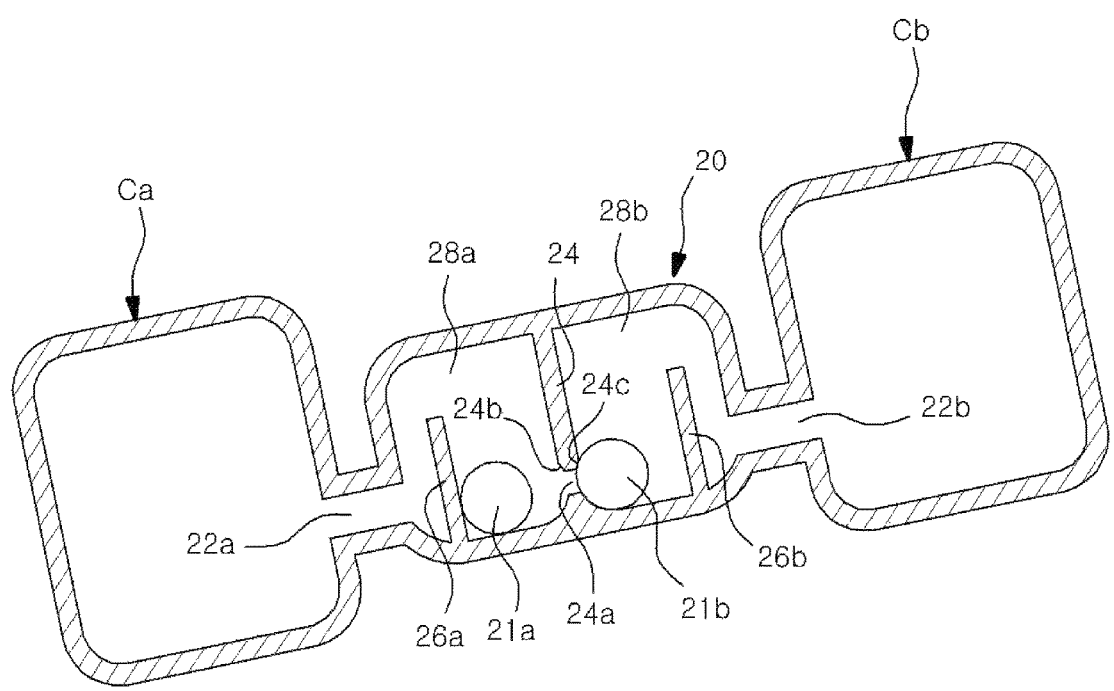
FIG. 5 is a cross-sectional view of a valve assembly according to a third embodiment of the present invention.
Figure 6:
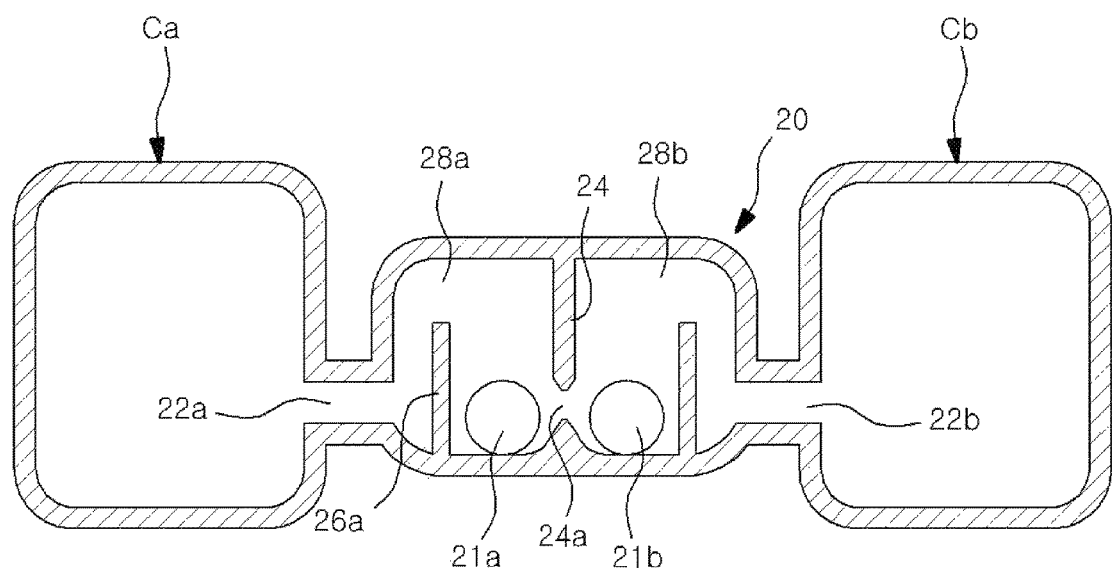
FIG. 6 is a cross-sectional view of the valve assembly inclined to one side according to the third embodiment of the present invention.
Figure 7:
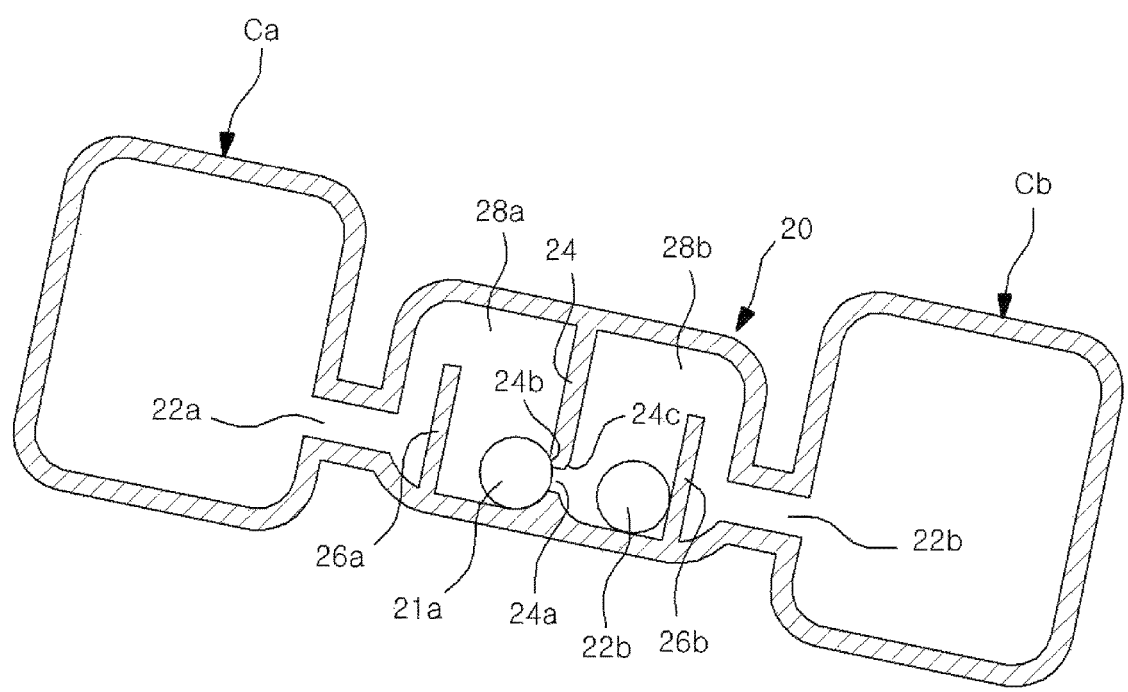
FIG. 7 is a cross-sectional view of the valve assembly inclined to the other side according to the third embodiment of the present invention.

Referring to FIG. 5 to FIG. 7, check rollers 21a and 21b have not the buoyancy but the sedimentation. FIG. 5 shows that a valve assembly according to this embodiment is level, FIG. 6 shows that the valve assembly is low at the left side, and FIG. 7 shows that the valve assembly is low at the right side.

In these embodiments, the valve assembly operates as follows. Referring to FIG. 6, a second check roller 21b is close contact with a second settling portion 24c of a through hole 24a and a first check roller 21a is separated from a first settling portion 24b of the through hole 24a since the check rollers 21a and 21b have the sedimentation. Therefore, fluid is not allowed to flow from an internal channel 28b at the right side toward an internal channel 28a at the left side.

However, in this state, it is quite possible to make the fluid flow from the internal channel 28a at the left side toward the internal channel 28b at the right side. Accordingly, if the left side is low as shown in FIG. 6, the flow of the fluid from the first fluid casing Ca to the second fluid casing Cb via the internal channel 18 is possible, but the flow of the fluid from the second fluid casing Cb toward the first fluid casing Ca via the internal channel 18 is impossible.

Referring to FIG. 7, the right side is lower than the left side, and thus the fluid is allowed to flow from the internal channel 28b at the right side to the internal channel 28a at the left side for the same reason as described above. This means that the fluid flows only in a direction from the second fluid casing Cb toward the first fluid casing Ca. As described above, it will be understood that the fluid flows from the relatively low-positioned fluid casing Ca toward the relatively high-positioned fluid casing Cb. Likewise, force of substantially moving the fluid is caused by external force, for example, force of pressing the fluid casing, etc.

If the valve body 10 is inclined as shown in FIG. 6 or FIG. 7, stoppers 26a and 26b prevent the check rollers 21a and 21b from being in contact with adjacent entrances 22a and 22b. Such a function of the stoppers 26a and 26b makes a flowing direction of the fluid be controlled according to only inclination directions of a valve body 20, and prevents obstructing the flow of the fluid as the check rollers 21a and 21b clog the corresponding entrances 22a and 22b or the through hole by the flow or pressure of the fluid inside the valve body 20.

Further, the flow direction of the fluid in the foregoing embodiments is quite changeable. For example, if the high-positioned second fluid casing Cb is connected to the first entrance 22a and the low-positioned first fluid casing Ca is connected to the second entrance 22b in the embodiment shown in FIG. 6, the fluid is allowed to flow from the high-positioned fluid casing Cb toward the low-positioned fluid casing Ca.

Figure 8:
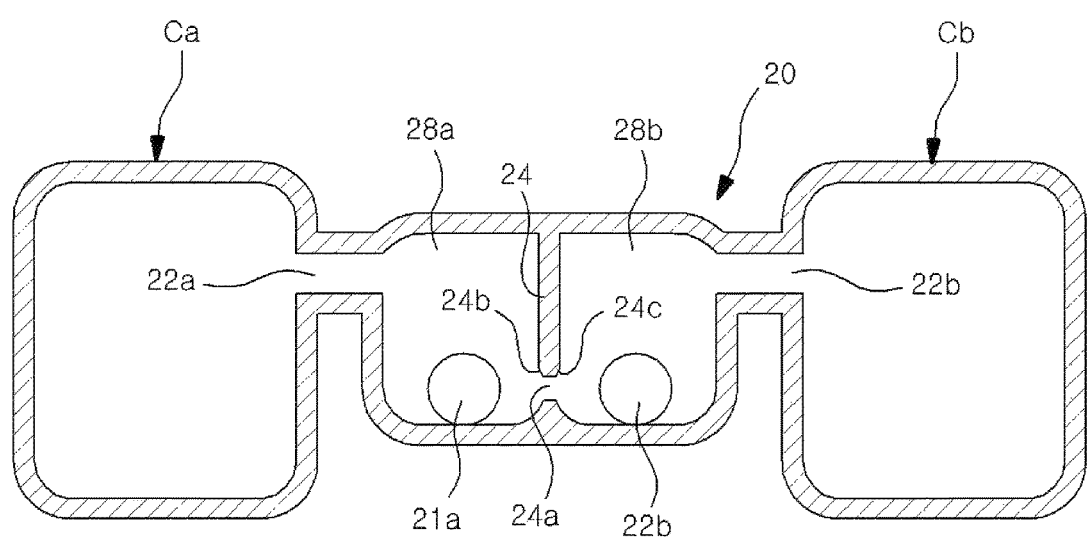
FIG. 8 is a cross-sectional view of a valve assembly according to a fourth embodiment of the present invention.

FIG. 8 illustrates a structure without the stoppers 26a and 26b of the foregoing embodiments shown in FIG. 5 to FIG. 7. In this structure, the first entrance 22a and the second entrance 22b are formed in an upper portion inside the valve body 20 since the check rollers 21a and 21b having sedimentation move only in a lower portion inside the valve body 20, thereby preventing the check rollers 21a and 21b from clogging the corresponding entrances 22a and 22b by the force of the fluid inside the valve body. Further, general operations of the valve assembly in this embodiment are substantially equivalent to those described above with reference to FIG. 6 and FIG. 7.

Figure 9:
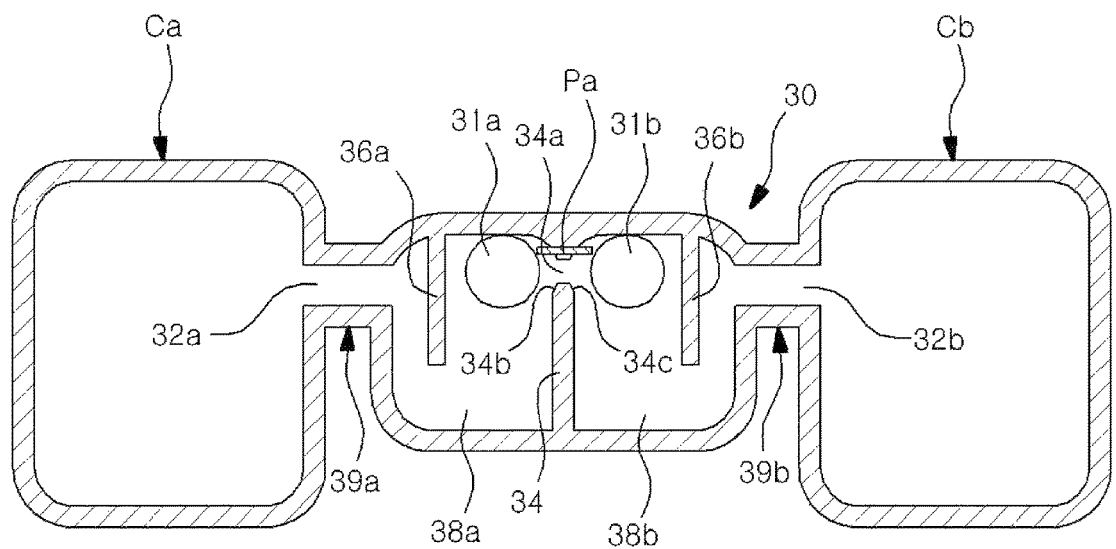
FIG. 9 is a cross-sectional view of a valve assembly according to a fifth embodiment of the present invention.

Below, an embodiment shown in FIG. 9 will be described. In this embodiment, it is possible to prevent restriction on moving check rollers 31a and 31b by pressure applied to internal channels 38a and 38b of a valve body 30, thereby accurately reacting with inclination when the valve body is inclined to one side.

In this embodiment, an interlocking pin Pa is placed at one side of a partition 34 and movable left and right within a predetermined range. The interlocking pin Pa is installed to interlock a first check roller 31a with a second check roller 31b. Elements other than the interlocking pin Pa in this embodiment are substantially equivalent to those shown in FIG. 1, and thus repetitive descriptions will be avoided. A basic function of the interlocking pin Pa will be described in detail based on operations.

Figure 10:
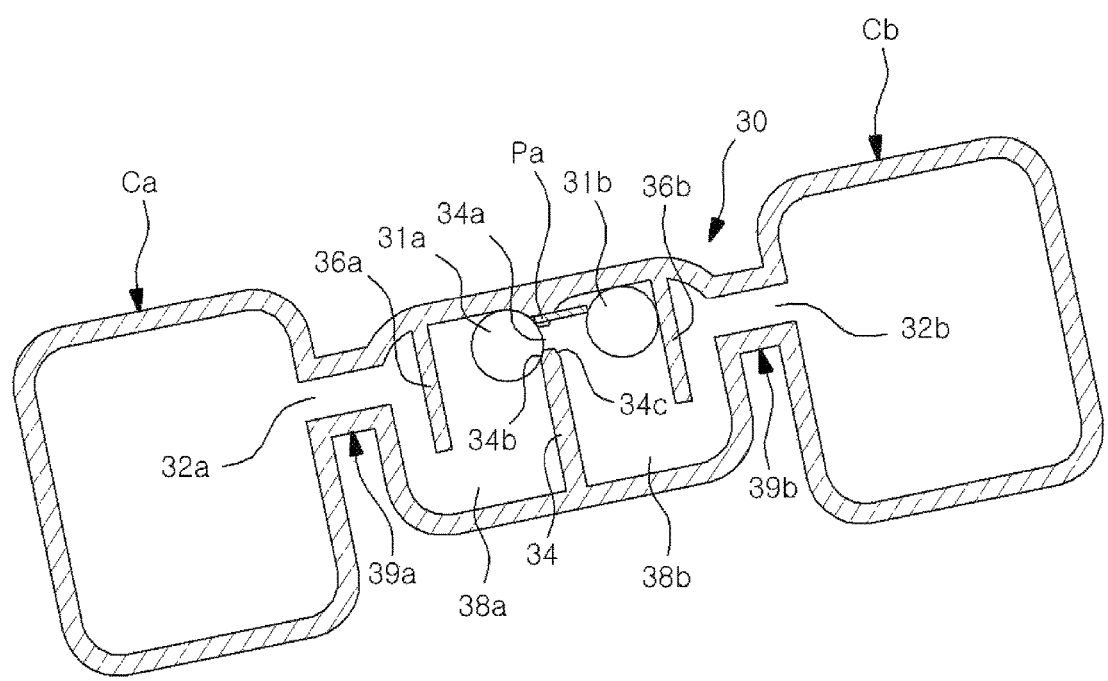
FIG. 10 is a cross-sectional view of the valve assembly inclined to one side according to the fifth embodiment of the present invention.

FIG. 10 illustrates a state that the valve body 30 is low at the left side and high at the right side. In this state, the first check roller 31a having buoyancy is in close contact with a settling portion 34b formed in a through hole 34a of the partition 34. Further, the second check roller 31b is separated from the through hole 34a. In this state, the fluid is prevented from flowing from a first internal channel 38a communicating with the first fluid casing Ca toward a second internal channel 38b, but is allowed to flow in the opposite direction, i.e. from the second internal channel 38b toward the first internal channel 38a.

To make the fluid flow from the second internal channel 38b toward the first internal channel 38a, the second check roller 31b has to be quickly separated from a second settling portion 34c of the partition 34 as shown in FIG. 10. By the way, in the state that the valve body 30 is inclined as shown in FIG. 10, if predetermined pressure acts as the fluid is supplied from the second entrance 32b toward the second internal channel 38b before the second check roller 31b is separated from the second settling portion 34c of the partition 34 and the pressure remains, the second check roller 31b may be not separated from the settling portion 34c.

In other words, if the pressure of the fluid supplied from the second fluid casing Cb remains and presses the second check roller 31b toward the left side even when the inclination is changed to have the low left side and the high right side as shown in FIG. 10, the second check roller 31b may continue to clog the through hole 34a of the partition 34. In this case, it is substantially regarded that the check rollers 31a and 31b react with the flow of the fluid inside the internal channels 38a and 38b or the pressure of the fluid caused by the flow of the fluid.

Since the valve assembly according to the present invention is technically aimed at controlling the fluid to flow only in a certain direction according to inclination directions of the valve body, it is preferable that the check rollers 31a and 31b have to react with only the inclination of the valve body while the reaction with the flow of the fluid inside the valve body or the force caused by the flow of the fluid is suppressed as much as possible.

Accordingly, the first check roller 31a and the second check roller 31b in this embodiment are interlocked with each other, thereby solving the foregoing problems. In the inclination state shown in FIG. 10, the first check roller 31a moves to clog the through hole 34. In connection with the movement of the first check roller 31a, the interlocking pin Pa makes the second check roller 31b move in the same direction as the movement of the first check roller 31a. According to the embodiments shown in FIG. 10 and FIG. 11, the movement of one check roller 31a or 31b is transferred to the other check roller 31b or 31a through the interlocking pin Pa so that they can move in the same direction.

Figure 11:
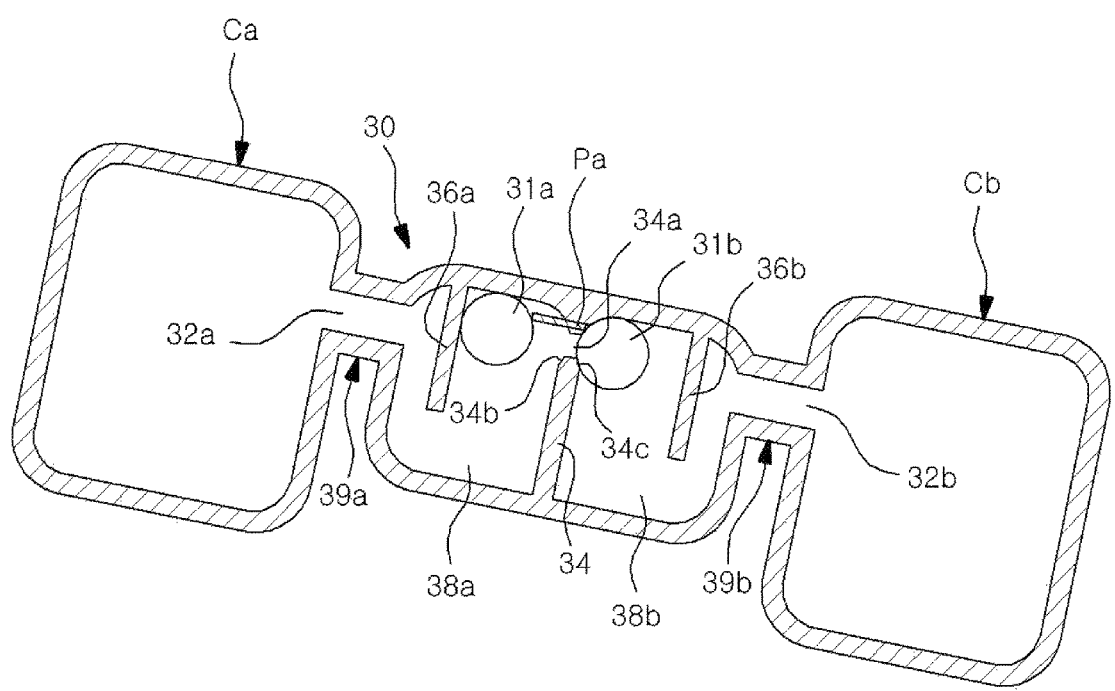
FIG. 11 is a cross-sectional view of the valve assembly inclined to the other side according to the fifth embodiment of the present invention.

Referring to FIG. 11, the inclination of the valve body 30 causes the second check roller 31b having the buoyancy to move so as to clog the through hole 34a of the partition 34. At this time, if the second check roller 34b approaches the through hole 34a to some extent, the second check roller 31b pushes the interlocking pin Pa toward the left side. Such force of the second check roller 31b is based on the buoyancy.

If the interlocking pin Pa is pushed toward the left side even a little bit, the opposite end of the interlocking pin Pa makes the first check roller 31a be a little separated from the through hole 34a. In the state shown in FIG. 11, the fluid is allowed to flow from the first fluid casing Ca toward the second fluid casing Cb. For example, the fluid inside the first fluid casing Ca is pressed against the through hole 34a by external force. In this state, if the first check roller 31a is separated from the through hole 34a, a gap between the first check roller 31a and the through hole 34a allows the fluid to flow through the through hole 34a.

Here, the separation of the first check roller 31a from the through hole 34a may be also explained with the second check roller 31b and the interlocking pin Pa. That is, the second check roller 31b approaches the through hole 34a to come in contact with and push the interlocking pin Pa based on the buoyancy caused by the inclination of the valve body 30. In this way, the left end of the interlocking pin Pa pushed toward the left side makes the first check roller 31a start separating from the through hole 34a. From this state, the movement distance of the second check roller 31b toward the left side is the same as the movement distance of the first check roller 31a toward the left side.

Figure 12:
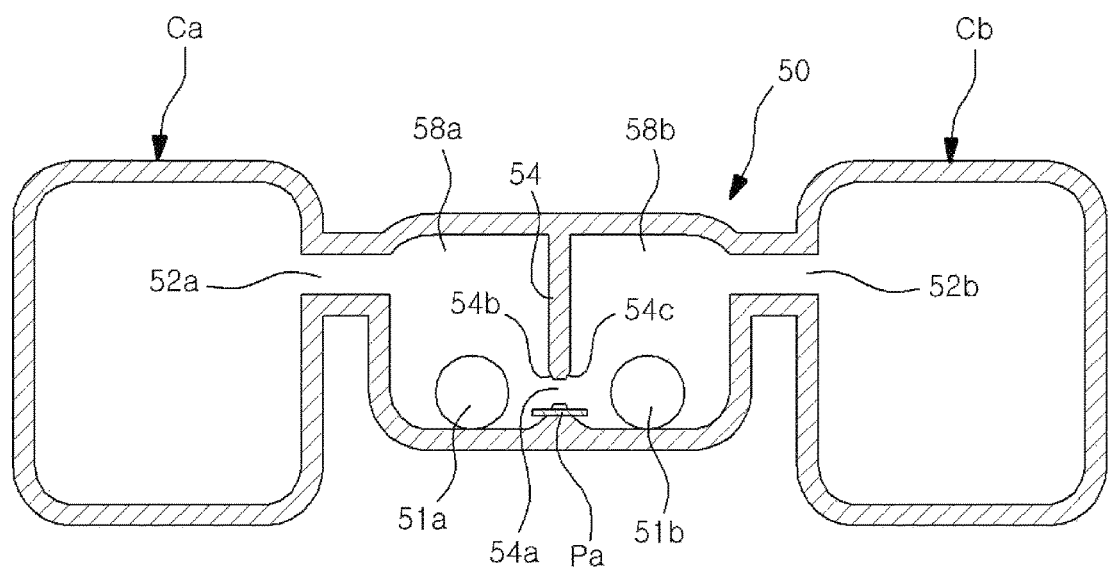
FIG. 12 is a plan view of a valve assembly according to a sixth embodiment of the present invention.

As shown in FIG. 12, the interlocking pin Pa according to the present invention may be also applied to check rollers 51a and 51b having sedimentation. As shown therein, if one check roller 51a moves, the movement is transferred to the other check roller 51b via the interlocking pin Pa Even in this embodiment, if the valve body 50 is inclined to one side, for example, when the first check roller 51a inside a first internal channel 58a approaches a through hole 54a of a partition 54 based on sedimentation, the first check roller 51a pushes the interlocking pin Pa. Accordingly, the interlocking pin Pa is pushed toward a second internal channel 58b, and the second check roller 51b is also pushed outward by the interlocking pin Pa and thus separated from the through hole 54a. These operations are substantially equivalent to those of the foregoing descriptions.

As described above, the interlocking pin Pa according to the present invention is provided to interlock and move the first check roller and the second check roller in substantially the same direction. This is because the valve assembly according to the present invention is aimed at controlling the fluid to flow in only one direction according to the inclination directions of the valve body, and such one-directional flow is possible when only one of the check rollers is used to clog the through hole.

Accordingly, the interlocking pin Pa according to the present invention is regarded as a means for substantially interlocking a pair of check rollers. That is, the interlocking pin Pa according to the present invention is defined as an interlocker capable of interlocking the movement of the first check roller with the movement of the second check roller when the first check roller approaches the through hole 34 to some extent. Alternatively, the interlocking pin Pa according to the present invention may be defined as an interlocker capable of interlocking the first check roller with the second check roller so that only one of the first check roller and the second check roller can be in contact with the through hole.

In addition, there may be various embodiments with regard to the structure of the interlocking pin Pa. As shown in the accompanying drawings, the interlocking pin Pa may be installed to be supported on the partition 34 and movable left and right within a predetermined range, so that one check roller can be separated from the through hole when the other check roller approaches the through hole. At this time, there are no limits to the shape of the interlocking pin Pa. For example, the interlocking pin Pa may have a bar shape or a plate shape having a predetermined area.

As an alternative embodiment to the interlocking pin Pa according to the present invention, the interlocking pin may have a configuration that a pair of check rollers 31a and 31b may be connected to be interlocked through the through hole 34a. Besides, various structures of the interlocking pin may be implemented to some interlocking extent as long as one check roller inside the internal channel of the valve body is in close contact with the through hole when the other check roller is separated from the through hole.

In the foregoing embodiments, one partition 14, 24 or 34 having the through hole 14a, 24a or 34a is provided. However, a pair of partitions may be provided. For example, with the embodiment shown in FIG. 1, the partition 14 may form a pair to be spaced apart from each other leaving a predetermined distance, so that one check roller 11a can be in close contact with one partition, and the other check roller 11b can be in contact with the other partition.

Figure 13:
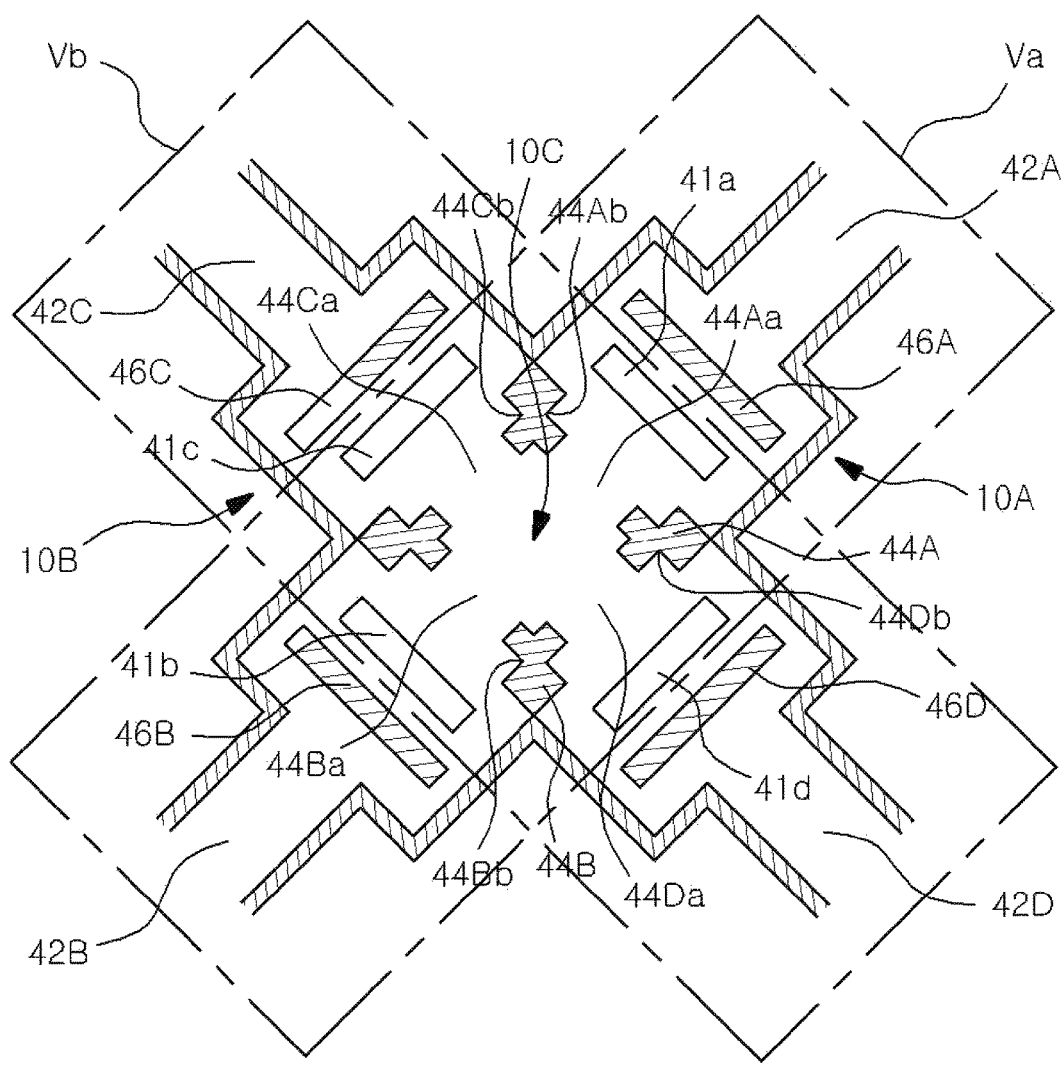
FIG. 13 is a plan view of the valve assembly, in which two valve assemblies shown in FIG. 1 are arranged to perpendicularly intersect with each other.

In the foregoing embodiments, the valve assembly includes one pair of check rollers and one pair of fluid casings. However, the valve assembly may include more check rollers and more fluid casings. FIG. 13 illustrates a valve assembly that includes four check rollers and four entrances.

FIG. 13 is a plan view of the valve assembly, in which two valve assemblies shown in FIG. 1 are arranged to perpendicularly intersect with each other. That is, a first valve assembly Va and a second valve assembly Vb are arranged to be perpendicular to each other and thus assembled into the valve assembly including four entrances and four check rollers.

In more detail, the first valve assembly Va is substantially the same as that shown in FIG. 1. Schematically, a valve body 10A of the first valve assembly Va includes a first entrance 42A and a second entrance 42B opposite to each other; a first stopper 46A and a second stopper 46B respectively installed more inward than the entrances 42A and 42B; a first check roller 41a and a second check roller 41b respectively placed more inward than the stoppers 46A and 46B; and a first partition 44A and a second partition 44B respectively installed more inward than the check rollers 41a and 41b and respectively formed with a first through hole 44Aa and a second through hole 44Ba.

Likewise, a valve body 10B of the second valve assembly Vb, which intersects the middle of the first valve assembly Va, includes a third entrance 42C and a fourth entrance 42D opposite to each other; and a third stopper 46C and a fourth stopper 46D respectively installed more inward than the entrances 42C and 42D. Further, a third check roller 41c and a second check roller 41d are respectively placed more inward than the stoppers 46C and 46D, and a third through hole 44Ca and a fourth through hole 44Da are respectively formed more inward than the check rollers 41c and 41d.

In this embodiment, the third through hole 44Ca and the fourth through hole 44Da are respectively formed in the first partition 44A and the second partition 44B. Alternatively, the third through hole 44Ca and the fourth through hole 44Da may be respectively formed in additional partitions. Further, the outer surfaces of the through holes 44Aa, 44Ba, 44Ca and 44Da are respectively formed with settling portions 44Ab, 44Bb, 44Cb and 44Db with which the four check rollers 41a, 41b, 41c and 41d are respectively in close contact to control the flow of the fluid from the respective entrances into the valve bodies 10A and 10B.

This embodiment is given on the assumption that the check rollers 41a, 41b, 41c and 41d in this embodiment are all made of a material having a lower specific gravity than the fluid and thus have buoyancy in the fluid. Of course, the check rollers in this embodiment may be made of a material having a higher specific gravity than the fluid and thus have sedimentation like those of the foregoing embodiment.

With this, it is assumed that the valve assembly is inclined so that the first entrance 42A and the third entrance 42C can be high and the second entrance 42B and the fourth entrance 42D can be low. In this inclination state, the second check roller 41b and the fourth check roller 41d placed around the low second and fourth entrances 42B and 42D are in close contact with the second settling portion 44Bb and the fourth settling portion 44Db due to the buoyancy.

In this state, the fluids from the second entrance 42B and the fourth entrance 42D are prevented from flowing to the inside 10C of the valve bodies 10A and 10B, but the fluid in the inside 10C of the valve body is allowed to flow to the second entrance 42B and the fourth entrance 42D via the second through hole 44Ba and the fourth through hole 44Da. If fluid casings are respectively installed outside the entrances 42A, 42B, 42C and 42D, the fluid is allowed to flow from the high fluid casings toward the low fluid casings in the embodiment shown in FIG. 13.

With the foregoing first and second valve assemblies Va and Vb, the check rollers 41a, 41b, 41c and 41d may be configured to have sedimentation. If the check rollers have the sedimentation, the check rollers will move in directions opposite to those of the foregoing embodiment according to the inclination directions and be in close contact with the respective settling portions, and do substantially the same operations as those of the embodiments shown in FIG. 5 to FIG. 7.

Even in this embodiment, the interlocking pin may be installed as shown in FIG. 9 to FIG. 12. For example, the interlocking pin may be installed over the first partition 44A and the second partition 44B corresponding to the first entrance 42A, and thus interlock the first check roller 41a with the second check roller 41b.

Specifically, if the first check roller 41a approaches the through hole 44Aa of the first partition 44A according to the valve assembly's own inclinations and is thus in contact with the installed interlocking pin, the interlocking pin is moved toward the second check roller 41b (being in close contact with the second settling portion 44Bb). Then, the first check roller 41a is substantially in close contact with the through hole 44Aa, thereby preventing the fluid from flowing in a direction from the first entrance 42A to the inside 10C of the valve body but allowing the fluid to flow in the opposite direction. The reason why such an interlocking pin is added has already been described above, and thus repetitive descriptions thereof will be avoided.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:
1. A valve assembly comprising:
a valve body including a partition formed therein, the partition having a through hole at an upper side thereof and dividing an inside space of the valve body into a first internal channel and a second internal channel, a first entrance disposed adjacent to the first internal channel for supplying a fluid from the first internal channel to an outside or a fluid from the outside to the first internal channel, and a second entrance disposed adjacent to the second internal channel for supplying a fluid from the second internal channel to an outside or a fluid from the outside to the second internal channel;
a first check roller and a second check roller received in the first internal channel and the second internal channel, respectively, and configured to be in contact with or separated from the through hole by buoyancy in a fluid in the first internal channel and the second internal channel according to inclination directions of the valve body; and a restrictor configured to prevent the first check roller and the second check roller from being in contact with the first entrance and the second entrance by buoyancy or flow of the fluid in the first internal channel and the second internal channel, wherein the restrictor comprises a pair of plate-shaped stoppers extended downward from a ceiling of the valve body between the first check roller and the first entrance and between the second check roller and the second entrance, respectively.

2. The valve assembly according to claim 1, further comprising an interlocker configured to interlock the second check roller with the first check roller to move in one direction so that movement of the first check roller approaching the through hole can cause the second check roller to move apart from the through hole.

3. The valve assembly according to claim 2, wherein the interlocker comprises an interlocking pin shaped like a bar or a plate supported on the partition and movable within a predetermined range.

4. The valve assembly according to claim 2, wherein the interlocker comprises an interlocking pin for interlocking the first check roller with the second check roller to move in one direction so that only one of the first check roller and the second check roller can be in contact with the through hole.

5. The valve assembly according to claim 1, further comprising a first fluid casing and a second fluid casing respectively connected to the first entrance and the second entrance and filled with the fluid.

6. A valve assembly comprising:
a valve body including a partition formed therein, the partition having a through hole at a lower side thereof and dividing an inside space of the valve body into a first internal channel and a second internal channel, a first entrance disposed adjacent to the first internal channel for supplying a fluid from the first internal channel to an outside or a fluid from the outside to the first internal channel, and a second entrance disposed adjacent to the second internal channel for supplying a fluid from the second internal channel to an outside or a fluid from the outside to the second internal channel;

a first check roller and a second check roller received in the first internal channel and the second internal channel, respectively, and configured to be in contact with or separated from the through hole by sinking force in a fluid in the first internal channel and the second internal channel according to inclination directions of the valve body; and a restrictor configured to prevent the first check roller and the second check roller from being in contact with the first entrance and the second entrance by sinking force or flow of the fluid in the first internal channel and the second internal channel, wherein the restrictor comprises a pair of plate-shaped stoppers extended upward from a bottom of the valve body between the first check roller and the first entrance and between the second check roller and the second entrance, respectively.

7. The valve assembly according to claim 6, further comprising an interlocker configured to interlock the second check roller with the first check roller to move in one direction so that movement of the first check roller approaching the through hole can cause the second check roller to move apart from the through hole.

8. The valve assembly according to claim 7, wherein the interlocker comprises an interlocking pin shaped like a bar or a plate supported on the partition and movable within a predetermined range.

9. The valve assembly according to claim 7, wherein the interlocker comprises an interlocking pin for interlocking the first check roller with the second check roller to move in one direction so that only one of the first check roller and the second check roller can be in contact with the through hole.

10. The valve assembly according to claim 6, further comprising a first fluid casing and a second fluid casing respectively connected to the first entrance and the second entrance and filled with the fluid.

* * * * *